United States Patent
Voelkel

(10) Patent No.: US 6,228,303 B1
(45) Date of Patent: May 8, 2001

(54) DISAPPEARING GATE TAB

(75) Inventor: James D. Voelkel, St. Charles, MO (US)

(73) Assignee: Semco Plastics Company, Inc., St. Louis, MO (US)

( * ) Notice: Subject to any disclaimer, the term of this patent is extended or adjusted under 35 U.S.C. 154(b) by 0 days.

(21) Appl. No.: 09/192,065

(22) Filed: Nov. 13, 1998

(51) Int. Cl.$^7$ .............................. B29C 45/27; B29C 45/38
(52) U.S. Cl. .................. 264/161; 264/328.7; 264/328.9; 264/328.12
(58) Field of Search ................................ 264/161, 163, 264/328.1, 328.7, 328.8, 328.9, 328.11, 328.12

(56) References Cited

U.S. PATENT DOCUMENTS

| | | | |
|---|---|---|---|
| 3,591,897 | * 7/1971 | Perras . | |
| 3,669,600 | 6/1972 | McLean, Jr. | 425/245 |
| 3,819,312 | * 6/1974 | Arpajian | 425/242 R |
| 3,978,186 | * 8/1976 | Lovejoy | 264/328.7 |
| 3,981,661 | * 9/1976 | Taylor | 425/247 |
| 4,306,852 | 12/1981 | Mateev et al. | 425/549 |
| 4,416,608 | 11/1983 | Deardurff | 425/548 |
| 4,482,515 | 11/1984 | Buhler et al. | 264/102 |
| 4,498,860 | 2/1985 | Gahan | 425/562 |
| 4,579,520 | 4/1986 | Gellert | 425/549 |
| 4,832,593 | 5/1989 | Brown | 425/564 |
| 5,192,556 | 3/1993 | Schmidt | 425/549 |
| 5,254,306 | 10/1993 | Inada et al. | 264/572 |
| 5,460,508 | 10/1995 | Ohno et al. | 425/554 |
| 5,511,968 | 4/1996 | Guzzini et al. | 425/564 |

* cited by examiner

Primary Examiner—Angela Ortiz

(57) ABSTRACT

A molding apparatus intended to produce a flush finished part without any gate tab. The apparatus has a gate selectively movable between a first position permitting flow of mold medium from the cold runner to enter the mold cavity and a second position blocking such flow, the gate in the second position fully filling the opening and having a surface exposed to the mold cavity which surface is flush with the interior wall to.

6 Claims, 3 Drawing Sheets

DISAPPEARING GATE TAB

BACKGROUND OF THE INVENTION

1. Field Of Invention The invention relates to plastic molding equipment and more particularly to injection port shutoff devices and methods.

2. Related Art

The conventional way of shutting off injection molding gates is by a gate that moves transversely across the gate opening. In some injection molding devices the shutoff is at the sprue end and in others there is a cold runner which runs from the end of the sprue to the mold gate and the shutoff is transverse to that cold runner. A few of the molding devices which have the shutoff at the end of the sprue use an oblique shutoff than goes into the gate to end up substantially flush with the inner surface of the mold wall, thus minimizing the amount of extra material left on the molded part. However, since the sprue is typically heated, this is hot molten plastic and will thus leave a mold flashing in the region of the clearance between the gate and the gate port. With the cold runner shutoffs, there is typically a tab left. These tabs and flashings are ubiquitous in molded plastic parts despite their recognized undesirability.

SUMMARY OF THE INVENTION

It is thus an object of the present invention to provide an injection molding apparatus which has no flashing or gate tab on the finished part.

It is further an object of the present invention to provide a method and apparatus capable of eliminating the tab on molded parts which have use a cold runner.

It is also an object of the present invention to provide a new approach to shut off of injection molding plastic in which the partially cross-linked partially hardened tab is forced into the molded part, to make it disappear.

These and other objects are surprisingly all achieved by the present invention which provides a shutoff assembly for a plastic injection molding mold cavity port in which a shutoff gate is oriented at an angle relative to a cold runner and is sized and shaped so as to fully displace an intersected portion of the cold runner Into the molded part and end such displacement at a position flush with an interior wall of the mold cavity so as to produce a flush molded part surface.

BRIEF DESCRIPTION OF THE DRAWING

The invention will be better understood by reference to the attached drawing, wherein.

DETAILED DESCRIPTION OF THE INVENTION

Figure 1:
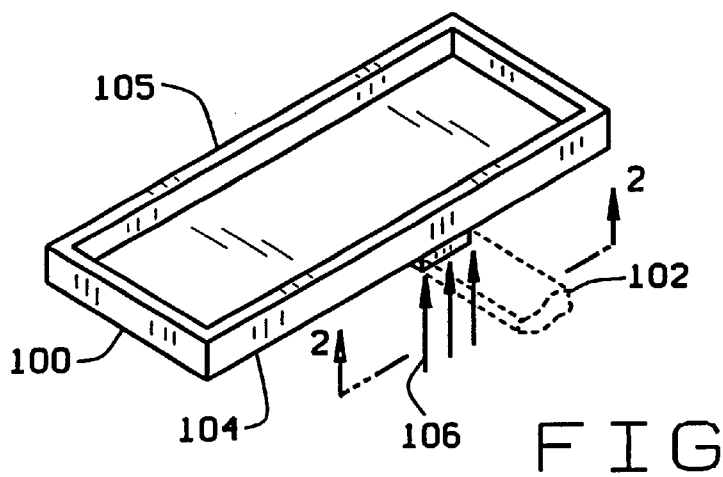
FIG. 1 is a front left upper exterior view of a molded part immediately prior to gate shutoff, with the surrounding mold not shown for clarity and the downstream part of a cold runner shown.

In order to eliminate the conventional gate tab or gate flashing, a novel approach has been utilized in which the shutoff gate for a cold runner fed mold cavity is activated after partial hardening of the plastic in the end of the cold runner adjacent to the mold cavity. The shutoff gate is moved transversely to the cold runner and is sized so as to end its shutting movement flush with the inner wall of the mold cavity to produce a flush part. The cold runner makes a transverse turn just before entering the mold cavity, and this gives a portion of the cold runner that can be shoved longitudinally into the mold cavity. The gate thus runs longitudinally along this turned end portion of the cold runner to force the contents of the turned end portion into the mold cavity. This results in the portion of the cold runner which is downstream of the gate being shoved into the molded part to a point flush with the remainder of the finished surface. The shutoff gate shown in the drawing is oriented parallel to the sprue and thus shoves the gate tab up into the mold cavity. The orientation could be sideways to shove the tab sideways into the molded part or could shove the tab down into the mold cavity. To put this another way, the invention provides a molding apparatus which includes a supply passage; a mold cavity having an opening and an interior wall defining a molded part; a cold runner in communication with both the mold cavity and the supply passage; and a gate selectively movable between a first position permitting flow of mold medium from the cold runner to enter the mold cavity and a second position blocking such flow, the gate in the second position fully filling the opening and having a surface exposed to the mold cavity which surface is flush with the interior wall to thereby produce a flush finished part.

Referring to the Figures, one preferred embodiment of the invention will be described, that being the embodiment where the gate is oriented parallel to the sprue. It is understood that other orientations are equivalent and are encompassed within the scope of the appended claims.

Looking first to FIG. 1, a partially molded part 100 is shown as it would exist in the mold just prior to gate closure. A cold runner 102 leads to the molded part and makes a right angle turn just prior to entering the cavity defining the molded part. The molded part at this stage would be partially cross-linked (i.e. partially hardened), so that it no longer flows, but Is still capable of further cross-linking. This state is crucial to the invention so that the flashing characteristic of prior art shutoff mechanisms of hot runners is eliminated. The molded part is a tray with a sidewall 104, although other shapes will be able to take advantage of the invention.

Figure 2:
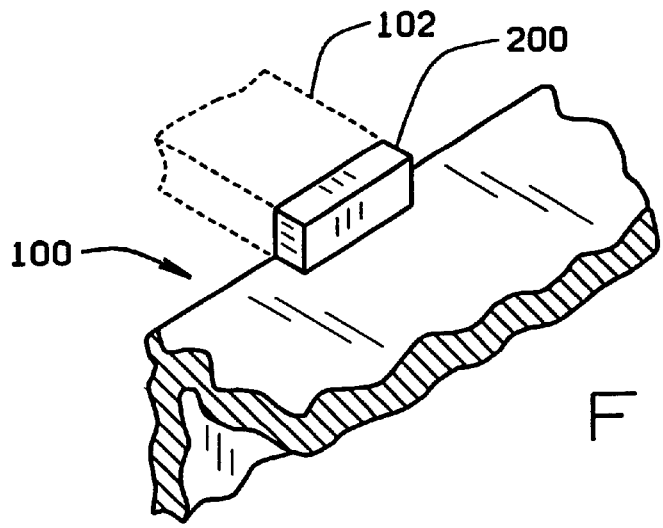
FIG. 2 is a full size bottom left rear view of the molded part and cold runner of FIG. 1 taken along lines 2—2 of FIG. 1.

Looking next to FIG. 2, which is inverted from FIG. 1 and is taken along lines 2—2 of FIG. 1, the cold runner 102 is joined to the molded part by a gate tab 200 or gate opening, which runs perpendicular to the cold runner 102. Again, it will be understood that while a perpendicular orientation is preferred, the orientation could be at an angle to the cold runner, provided the shutoff gate (described below) has a lower surface which will end up flush with the interior wall of the mold cavity defining the molded part.

Figure 3:
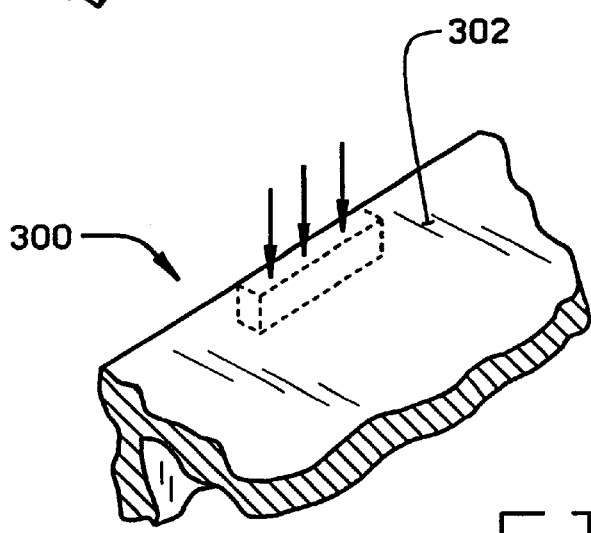
FIG. 3 is a full size bottom left rear view of the molded part of FIG. 1, after gate shutoff showing the location of the gate tab after it is shoved up into the bottom of the molded part.

FIG. 3, which is inverted similar to FIG. 2, shows the molded part 100a following closure of the shutoff gate to force tab 3020 upward (downwards in FIG. 3) into sidewall 104. The shutoff gate is closed at a time when the molded part is sufficiently cross-linked to minimize flashing, but is not yet fully cross-linked. Once the gate is closed and the molded part assumes the configuration of FIG. 3, the molded part is allowed to fully cross-link to bond the inserted tab 3020 integrally into sidewall 104 to produce the flush finished surface 302.

In actual use, it might be preferred to locate the tab at a different location, such as at the open end 105 of sidewall 104 (top in FIG. 1), and this could be easily done by inverting the molded part so that it opened down during molding or by gating from the top. It has been found most practical to have the shutoff gate move upwardly, although other configurations are possible.

Figure 4:
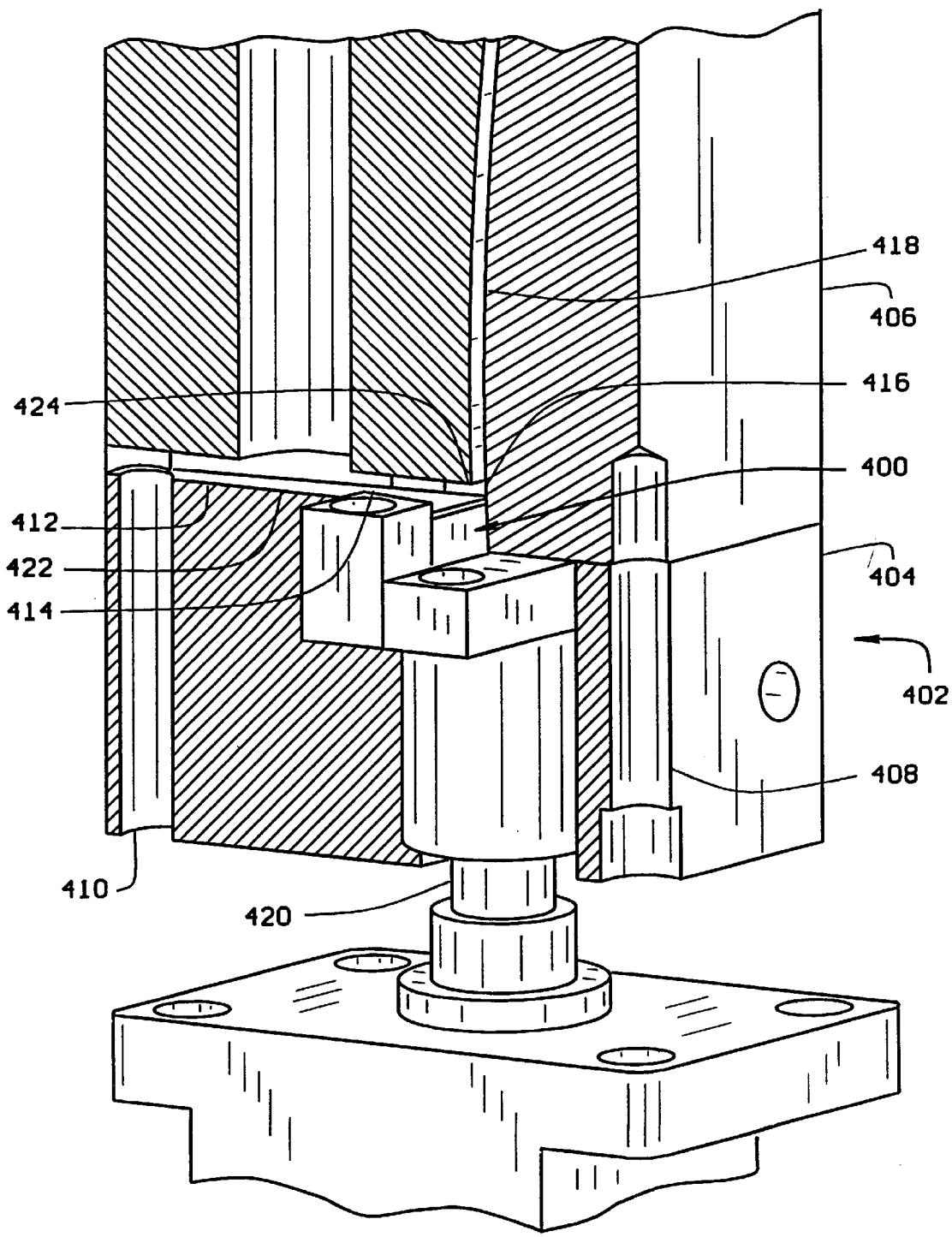
FIG. 4 is a left front cross sectional view through a molding device which has a gate shutoff according to one aspect of the invention which might be used to produce the molded part of FIG. 3, the gate being in an open position allow plastic flow.

Looking next to FIG. 4, one such upward moving shutoff gate 400, is shown in a molding press 402. The molding press 402 includes a lower portion 404 and an upper portion 406, which could be held together by a bolt (not shown) threaded through an opening 408 of lower portion 404 and into an aligned opening 410 of upper portion 406. A sprue 410 leads upwardly to a horizontal cold runner 412 with a flared end 414 which leads to an upward opening 416 to mold cavity 418. An appropriate ram 420 is used to drive shutoff gate upwardly at the appropriate time to close off flared end 414 and drive the portion of flared end 414 above gate 400 upwardly into cavity 418.

Figure 5:
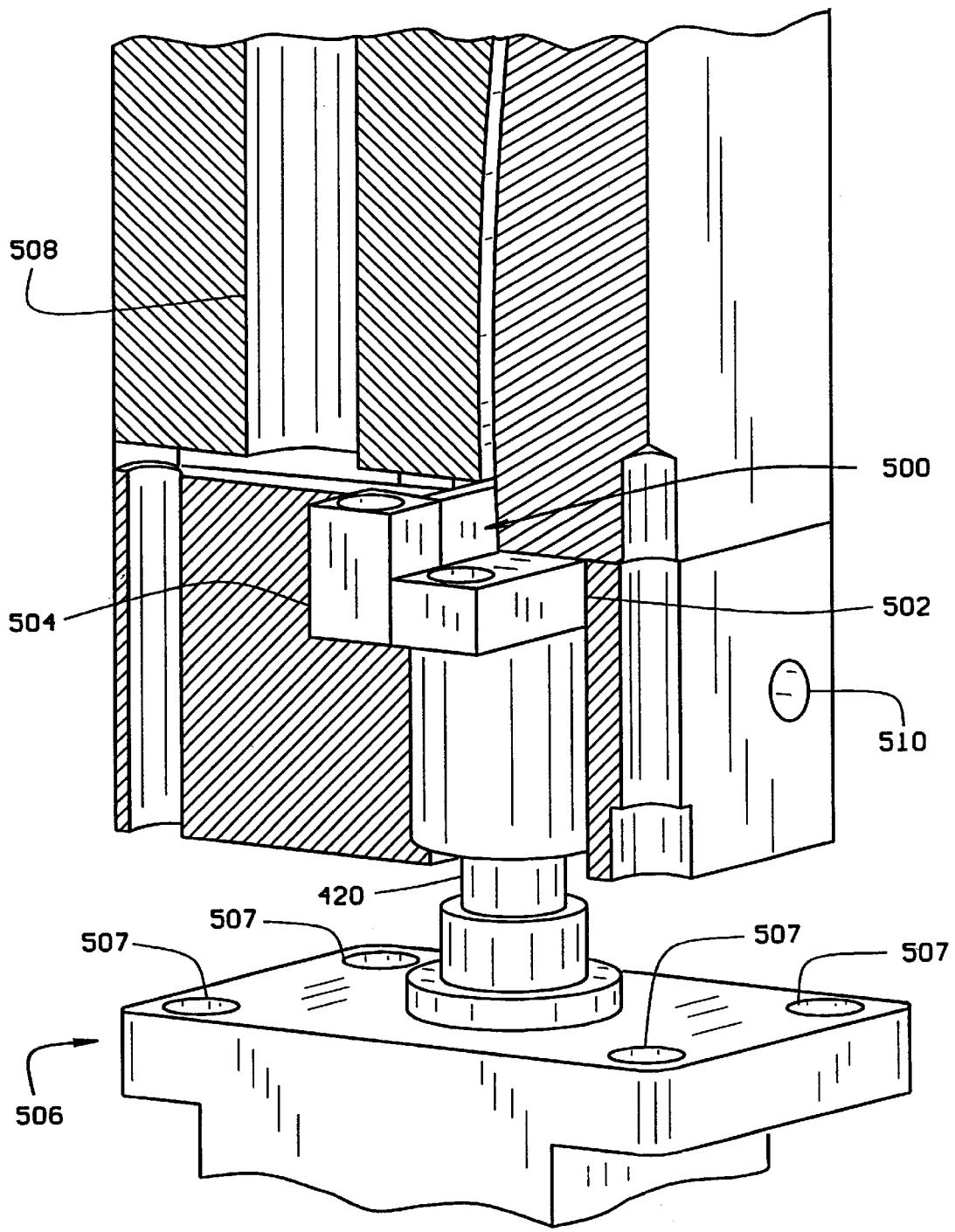
FIG. 5 is a left front cross sectional view similar to FIG. 4 except that the gate is in the closed position.

This is seen in FIG. 5, which is identical to FIG. 4, except that gate 400 is in an upward position 500 flush with the top of flared end 414 and closing off the right side of flared end 414. This is shown by arrows 106 of FIG. 1 and results in the embedding of that portion of flared end above gate 400 in the remainder of the plastic in mold cavity 418. This flared portion 414 is not shown in FIGS. 1–3, but is preferred for a better pattern of plastic flow into the mold cavity. Special inserts 502 and 504 can be provided to define flared end 414 and to provide close tolerance fit for shutoff gate 400 to minimize flashing. In this way, a flush finish surface is easily produced on an injection molded part in production quantities. Ram 420 can be supported by any suitable support structure 506, secured by fasteners through openings 507 or by any other desired fastener. Ram 420 could be powered by electrical, pneumatic, hydraulic or any other motive means appropriate for injection molding applications. A cavity 508 can be provided in upper portion 406 for a suitable heater (not shown) or other device or purpose customary in plastic injection molding. Likewise a cross bolt hole 510 or any other passageways could be provided in lower portion 404 as desired for any particular molding apparatus. It is apparent that the gate intersects the cold runner at an angle, and that, in this preferred embodiment, the angle is a right angle. Note that the gate 400 when in the first position is flush with a side, specifically the bottom side 422, of the cold runner opposite the opening 424 into mold cavity 418. It is also preferred that the mold cavity 418 has a thickness adjacent the opening both equal to the thickness of the opening 424 and equal to the thickness of the gate 400. The sprue 410 is directed vertically upward and thus is parallel to the vertically upward direction of movement of the gate when moving from the first or open position shown in FIG. 4 to the second or closed position of FIG. 5, although it is again noted that such orientation is merely preferred and other orientations could also be used should the design of the molded part so dictate.

In operation, this structure provides a method of injection molding, which comprises the steps of supplying mold medium to a passageway; passing the mold medium through the passageway; directing the flow of fluid from the passageway through a cold runner to a mold cavity opening and through the mold cavity opening into a mold cavity; and moving a gate across an end of the cold runner and into the mold cavity opening to a position flush with a wall of the mold cavity, whereby to produce a flush finish on the molded part adjacent to and in the region of the opening. In the preferred embodiment shown the gate starts out on the bottom of the cold runner and ends up at the upper surface of the cold runner. Thus, the gate in its first position forms the bottom of the downstream end of the cold runner and in its upper position forms the downstream end wall of the cold runner and the bottom of the mold cavity. This means that the upper surface of the cold runner is in the plane of the bottom of the mold cavity. This means that the length of gate movement equals the thickness of the cold runner.

It will be apparent that this is merely a preferred embodiment, and that variations such as noted above and others obvious to those of ordinary skill in the art of injection molding can be made. The invention as defined by the claims below is intended to encompass such equivalents or alternatives.

All patents referenced herein are incorporated in their entirety, as if set forth at length herein.

What is claimed is:

1. A method of injection molding, which comprises the steps of:

a) supplying mold medium to a passageway;

b) passing the mold medium through the passageway;

c) directing the flow of fluid from the passageway through a cold runner and transversely to a mold cavity opening and through the mold cavity into a mold cavity opening into the mold cavity and said cold runner having an outwardly flared portion adjacent said mold cavity opening;

d) allowing the mold medium to partially harden;

e) moving a gate having an end surface with outermost dimensions substantially equivalent to the innermost dimension of the mold cavity opening from a first retracted position even with a side of the cold runner opposite the mold cavity opening, across an end of the cold runner, and into the mold cavity opening to a second position flush with a wall of the mold cavity forming a flush boundary wall of the mold cavity, whereby the gate, while moving from said first position to said second position transversely cuts off the portion of the mold medium in the cold runner downstream of said gate, drives and embeds said cut off end into the mold cavity so as to produce a flush finish on the molded part adjacent to and in the region of the opening.

2. The method of injection molding of claim 1, wherein the direction of gate movement between the first and second positions is at right angles to the direction of flow through the cold runner.

3. The method of injection molding of claim 1, wherein the direction of gate movement between the first and second positions is parallel to the direction of movement of fluid in the passageway.

4. The method of injection molding of claim 1, wherein the step of directing includes flaring portions of the medium flow in the cold runner near a downstream end of the cold runner adjacent the opening.

5. The method of injection molding of claim 1, wherein the gate in the first position is flush with a side of the cold runner away from the opening and transverses a distance substantially equivalent to the breadth of the cold runner to the second position.

6. The method of injection molding of claim 1, wherein the length of gate movement equals the thickness of the cold runner and where the gate has stationery inserts on either side defining the flared end of the cold runner when said gate is in the first retracted position.

* * * * *